No. 864,632. PATENTED AUG. 27, 1907.
T. J. FEGLEY.
ICE CREAM FREEZER.
APPLICATION FILED SEPT. 22, 1906.

Witnesses:
Titus H. Jones.
Augustus B. Coppes

Inventor,
Thomas J. Fegley.
by his Attorneys
Howson & Howson

THE NORRIS PETERS CO., WASHINGTON, D. C.

UNITED STATES PATENT OFFICE.

THOMAS J. FEGLEY, OF PHILADELPHIA, PENNSYLVANIA, ASSIGNOR TO NORTH BROTHERS MANUFACTURING COMPANY, OF PHILADELPHIA, PENNSYLVANIA, A CORPORATION OF PENNSYLVANIA.

ICE-CREAM FREEZER.

No. 864,632.      Specification of Letters Patent.      Patented Aug. 27, 1907.

Original application filed June 25, 1904, Serial No. 214,122. Divided and this application filed September 22, 1906. Serial No. 335,723.

*To all whom it may concern:*

Be it known that I, THOMAS J. FEGLEY, a citizen of the United States, residing in Philadelphia, Pennsylvania, have invented certain Improvements in Ice-Cream Freezers, of which the following is a specification.

Figure 3:
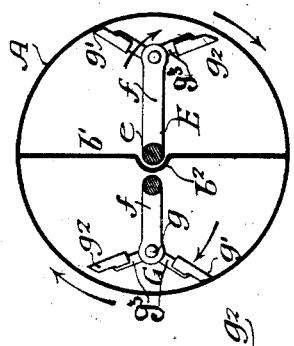
Figure 2:
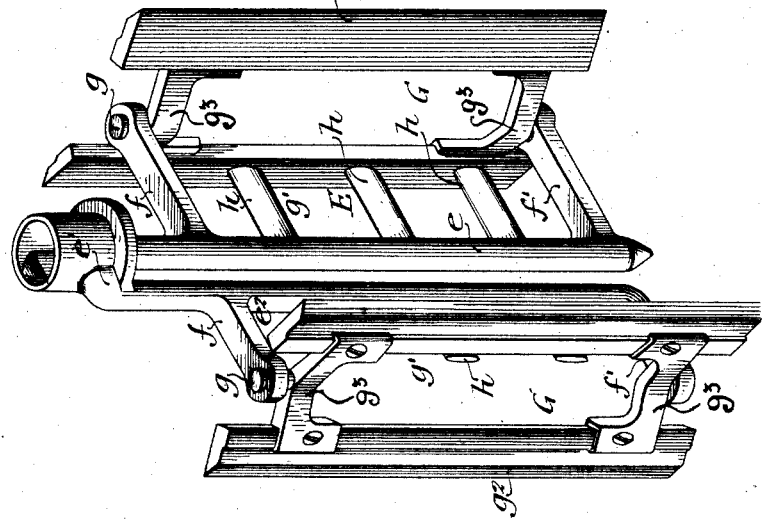
Figure 1:
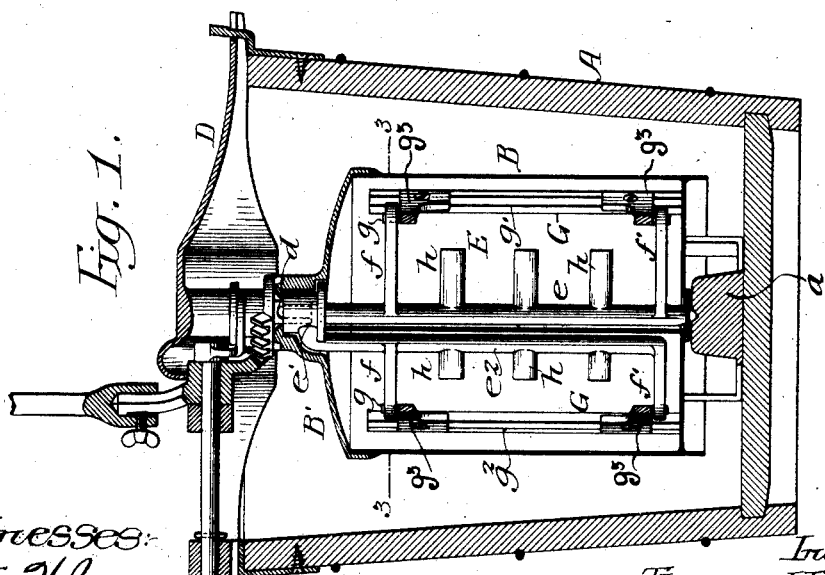

The object of my invention is to so construct an ice cream freezer of the reciprocating type as to cause the scrapers of the dasher to automatically adjust themselves in position to scrape the can. This object I attain in the following manner reference being had to the accompanying drawings, in which Figure 1, is a vertical sectional view of an ice cream freezer illustrating my invention; Fig. 2, is a detached perspective view of the dasher, and Fig. 3, is a sectional view on the line 3—3, Fig. 1.

A is the tub of an ice cream freezer in which is mounted the can B, D is the cross frame carrying the driving mechanism, which is fully illustrated and claimed in a pending application Serial No. 214,122 filed June 25th, 1904, of which this application is a division.

The can B has a central pivot mounted in a bearing $a$ in the bottom of the tub A, and a cap B′ which in the present instance is coupled to the driving mechanism.

E is the dasher having a central stem $e$ pointed at the lower end so that it will rest in a center bearing in the bottom of the can B the upper end $e'$ of the stem is enlarged and has a cavity for the reception of the depending stud $d$ of the cross frame D. Thus the dasher is held centrally while the can is free to be reciprocated or rotated around it.

In the present instance the can is divided into two parts by a vertical partition $b'$, and this partition is offset at $b^2$ so as to be clear of the central stem $e$ of the dasher as shown in Fig. 3. This construction of can enables the user to freeze two kinds of ice cream at once.

Depending from the enlargement $e'$ at the upper end of the dasher is a stem $e^2$ extending parallel with the stem $e$. The stems are placed a sufficient distance apart so that the dasher will straddle the partition $b'$, one stem being on one side of the partition and the other stem being on the opposite side. Projecting from each stem are upper and lower arms $f, f'$ having openings for the pivot pins $g$ of the scrapers G, G.

Each scraper is made double having two blades $g'$, $g^2$, one projecting on one side of the center and the other on the opposite side, and the blades preferably rest on the bottom of the can as shown in Fig. 1.

In the present instance the scrapers G are made up of two castings $g^3$, $g^3$ and two blades $g'$ and $g^2$, the blades being rigidly attached to the castings and a pivot pin $g$ projects from each casting.

On each stem of the dasher are projecting vanes $h$ which may be of any form desired.

It will be understood that my invention may be used with a can in which the partition is omitted as the can may be reciprocated so that the scrapers will scrape the entire inner surface of the can.

When the can is moved in the direction of the arrow Fig. 3, the friction of the bottom of the can against the end of the blades will cause the blade $g'$ to move in the direction of the arrow against the body of the can, scraping it and removing the frozen material from the can, while the other blade $g^2$ is moved away from the can and causes the material which is not in a frozen state to be forced against the body of the can, thus producing the best action possible for evenly freezing the material.

When the can is reversed the blade $g^2$ is forced against the can and the blade $g'$ is withdrawn, thus in reciprocating the can by the mechanism above described, the blades scrape the surface of the can and rapidly freeze the material.

While I have illustrated my invention in connection with a freezer in which the can only is reciprocated, it will be understood that the invention can be used in a freezer in which both the can and the dasher are reciprocated or in which the dasher alone is reciprocated.

I claim:—

1. The combination in an ice cream freezer, of a can, a dasher in the can, the dasher having a scraper pivoted thereto, said scraper having two blades each resting on the bottom of the can, and either capable of being brought against the side of the can when the other is distant from such side, substantially as described.

2. The combination in an ice cream freezer, of a can having a central partition dividing it into two parts, a dasher made in two sections, one section extending into one part and the other section extending into the other part of the can, each section of said dasher having a scraper pivoted thereto, each scraper having two blades, one projecting on one side of the pivot and the other on the opposite side, said blades resting on the bottom of the can, and either capable of being brought against the side of the can when the other is away from said side, substantially as described.

3. A dasher having a central stem and a stem at one side thereof and parallel thereto, upper and lower arms projecting from each stem, scrapers pivoted to said arms, each scraper having two blades and being free to swing on the arms to permit either of the blades to swing against the body of the can when the other is moved away from said body, substantially as described.

4. The combination in an ice cream freezer, of a can, a dasher in the can having pivoted to it a scraper, with two blades mounted on said scraper so that either of them is free to oscillate into or out of engagement with the side of the can, said blades resting upon the bottom of said can and lying in different planes at an angle to each other, substantially as described.

In testimony whereof, I have signed my name to this specification, in the presence of two subscribing witnesses.

THOMAS J. FEGLEY.

Witnesses:
WILL. A. BARR,
JOS. H. KLEIN.